United States Patent
Akamatsu et al.

(10) Patent No.: US 6,461,670 B2
(45) Date of Patent: Oct. 8, 2002

(54) WATER-REPELLENT SOLUTION AND METHOD OF FORMING WATER-REPELLENT FILM ON SUBSTRATE BY USING THE SOLUTION

(75) Inventors: Yoshinori Akamatsu; Shigeo Hamaguchi, both of Mie (JP)

(73) Assignee: Central Glass Company, Ltd., Ube (JP)

( * ) Notice: Subject to any disclaimer, the term of this patent is extended or adjusted under 35 U.S.C. 154(b) by 0 days.

(21) Appl. No.: 09/811,588

(22) Filed: Mar. 20, 2001

(65) Prior Publication Data

US 2001/0019773 A1 Sep. 6, 2001

Related U.S. Application Data

(62) Division of application No. 09/248,994, filed on Feb. 12, 1999, now Pat. No. 6,235,833.

(30) Foreign Application Priority Data

Feb. 13, 1998 (JP) ................................. 10-30788
Aug. 11, 1998 (JP) ............................ 10-226653

(51) Int. Cl.⁷ ................................. B05D 5/06
(52) U.S. Cl. ...................... 427/165; 427/168; 427/169; 427/309; 427/389.7; 427/393.4
(58) Field of Search ............... 427/389.7, 393.4, 427/309, 165, 168, 169

(56) References Cited

U.S. PATENT DOCUMENTS

| | | | | |
|---|---|---|---|---|
| 5,314,731 A | * | 5/1994 | Yoneda et al. | 428/429 |
| 5,413,865 A | | 5/1995 | Nakamura et al. | 428/432 |
| 5,808,125 A | * | 9/1998 | Standke et al. | 556/424 |
| 6,235,833 B1 | | 5/2001 | Akamatsu | 524/588 |

FOREIGN PATENT DOCUMENTS

| | | |
|---|---|---|
| EP | 545258 | 11/1992 |
| EP | 658525 | 11/1994 |
| EP | 748775 | 5/1996 |
| EP | 810186 | 5/1997 |
| EP | 887394 | 6/1998 |
| JP | 57-177082 | 10/1982 |
| JP | 58-122979 | 7/1983 |
| JP | 58-129082 | 8/1983 |
| JP | 3-247537 | 11/1991 |
| JP | 5-147976 | 6/1993 |
| JP | 5-319867 | 12/1993 |
| JP | 5-319868 | 12/1993 |
| JP | 6-184527 | 7/1994 |
| JP | 6-298545 | 10/1994 |
| JP | 7-138050 | 5/1995 |
| JP | 7-179850 | 7/1995 |
| JP | 8-40748 | 2/1996 |
| JP | 8-040748 | 2/1996 |
| JP | 8-157643 | 6/1996 |
| JP | 8-277388 | 10/1996 |
| JP | 9-132433 | 5/1997 |
| JP | 9-299880 | 11/1997 |
| JP | 9-309745 | 12/1997 |
| JP | 9-309746 | 12/1997 |

OTHER PUBLICATIONS

*Chemical Abstracts*, Abstract No. 1988:650492 and Derwent Abstract No. 98–589944 of Published Japanese Patent Application No. JP 10–265767. No Date.

* cited by examiner

Primary Examiner—D. S. Nakarani
(74) Attorney, Agent, or Firm—Crowell & Moring LLP

(57) ABSTRACT

A water-repellent solution for forming a superior water-repellent film on a glass substrate is produced by subjecting a fluoroalkyl-group contained silane compound to a hydrolysis and a condensation polymerization. With this, at least dimers and trimers of the silane compound are produced. In case wherein the fluoroalkyl-group contained silane compound is of a type having the following general formula, satisfied performance of the formed water-repellent film is expected:

$$CF_3(CF_2)_m(CH_2)_2SiX_3$$

wherein "m" is equal to or greater than 7 (seven) and "X" represents halogen, isocyanate-group or alkoxy-group, said alkoxy-group including methoxy-group [$OCH_3$], ethoxy-group [$OC_2H_5$] or isopropoxy-group [$OC_3H_5$]. When the "m" is equal to or greater than 9 (nine), the performance of the film is much increased.

4 Claims, 4 Drawing Sheets

WATER-REPELLENT SOLUTION AND METHOD OF FORMING WATER-REPELLENT FILM ON SUBSTRATE BY USING THE SOLUTION

This application is a division of co-pending application Ser No. 09/248,994, filed Feb. 12, 1999, now U.S. Pat. No. 6,235,833.

BACKGROUND OF THE INVENTION

The present invention relates in general to a water-repellent solution and a method of forming a water-repellent film by using the solution. More specifically, the present invention relates to a water-repellent solution which is applicable to vehicular and architectural window or mirror glass plates to form thereon a water-repellent film. Furthermore, the present invention relates to a method of forming a water-repellent film on such window or mirror glass plates by using the water-repellent solution.

Hitherto, various types of water-repellent solutions and methods of producing a water-repellent film on a glass plate by using the solutions have been proposed and put into practical use, some of which are described in Japanese Patent First Provisional Publications 9-132433, 9-309746, 3-247537, 58-122979 and 58-129082 and Japanese Patent 2,500,178.

However, due to their inherencies, the techniques disclosed and suggested by these publications have failed to give users satisfaction. That is, some of them need a troublesome and expensive handling process for producing the water-repellent solution and/or forming the water-repellent film on a glass substrate, and some of them fail to provide the glass substrate with a film which exhibits a satisfied performance in water repellency and durability.

SUMMARY OF THE INVENTION

It is therefor an object of the present invention to provide a water-repellent solution and a method of forming a water-repellent film by using the solution, which are free of the above-mentioned drawbacks possessed by the conventional techniques.

That is, it is an object of the present invention to provide a water-repellent solution which is suitable for forming a water-repellent film on a glass substrate, which is superior in water repellency, abrasion resistance and durability.

It is another object of the present invention to provide a method of forming such high performance water-repellent film on a glass substrate by using the water-repellent solution.

It is still another object of the present invention to provide a water-repellent layered article having such water-repellent film formed on a substitute.

It is a further object to provide a method of producing such water-repellent layered article.

According to a first aspect of the present invention, there is provided a water-repellent solution for application to a substrate to form on a surface thereof a water-repellent film. The solution comprises polymers of a fluoroalkyl-group contained silane compound, and the polymers include at least dimers and trimers.

According to a second aspect of the present invention, there is provided a method of forming a water-repellent film on a substrate. The method comprises the steps of: preparing a water-repellent solution, the solution being produced by subjecting a fluoroalkyl-group contained silane compound to a hydrolysis and a condensation polymerization thereby to produce at least dimers and trimers of the silane compound; applying the water-repellent solution to a surface of the substrate; and heating the substrate to cause the fluoroalkyl-group in the solution to be bonded to the surface of the substrate thereby to form the water-repellent film on the substrate.

According to a third aspect of the present invention, there is provided a water-repellent layered article which comprises a substrate; and a water-repellent film formed on a surface of the substrate. The film is prepared by applying a water-repellent solution to the surface. The water-repellent solution is prepared by subjecting a fluoroalkyl-group contained silane compound to a hydrolysis and a condensation polymerization. The fluoroalkyl-group contained silane compound is represented by the following general formula:

$$CF_3(CF_2)_m(CH_2)_2SiX_3$$

wherein "m" is equal to or greater than 7 and "X" represents halogen, isocyanate-group or alkoxy-group, the alkoxy-group including methoxy-group [$OCH_3$], ethoxy-group [$OC_2H_5$] or isopropoxy-group [$OC_3H_5$].

According to a fourth aspect of the present invention, there is provided a method of producing a water-repellent layered article. The method comprises the steps of preparing a water-repellent solution and a substrate, the solution being produced by subjecting a fluoroalkyl-group contained silane compound to a hydrolysis and a condensation polymerization; applying the water-repellent solution to a surface of the substrate; and heating the substrate to cause the fluoroalkyl-group in the solution to be bonded to the surface of the substrate thereby to form the water-repellent film on the substrate, wherein the fluoroalkyl-group contained silane compound is represented by the following general formula:

$$CF_3(CF_2)_m(CH_2)_2SiX_3$$

wherein "m" is equal to or greater than 7 and "X" represents halogen, isocyanate-group or alkoxy-group, the alkoxy-group including methoxy-group [$OCH_3$], ethoxy-group [$OC_2H_5$] or isopropoxy-group [$OC_3H_5$].

BRIEF DESCRIPTION OF THE DRAWINGS

Other objects and advantages of the present invention will become apparent from the following description when taken in conjunction with the accompanying drawings, in which.

DETAILED DESCRIPTION OF THE EMBODIMENTS

First, a first embodiment of the present invention will be described, which is a water-repellent solution suitable for forming a water-repellent film on a glass substrate.

For producing the water-repellent solution of the first embodiment, the following production process is carried out.

That is, as will be described in detail hereinafter, a fluoroalkyl-group contained silane compound as a main water-repellent material, a solvent as a diluting solution and an acid solution as a catalyst are mixed at a given mixing ratio, and stirred for a given time to complete a hydrolysis reaction. Then, with addition of a dehydrating agent, the solution is subjected to a dehydration treatment for a given time to establish a condensation polymerization.

As the water-repellent main material, fluoroalkylalkoxysilane-system compounds or fluoroalkylhalidesilane-system compounds are usable, which are, for example, $CF_3CH_2CH_2Si(OR)_3$, $CF_3(CF_2)_5CH_2CH_2Si(OR)_3$, $CF_3(CF_2)_5CH_2CH_2SiR(OR)_2$, $CF_3(CF_2)_7CH_2CH_2Si(OR)_3$, $CF_3(CF_2)_7CH_2CH_2SiR(OR)_2$, $CF_3CH_2CH_2SiCl_3$, $CF_3(CF_2)_5CH_2CH_2SiCl_3$, $CF_3(CF_2)_5CH_2CH_2SiRCl_2$, $CF_3(CF_2)_7CH_2CH_2SiCl_3$, $CF_3(CF_2)_7CH_2CH_2SiRCl_2$, $CF_3(CF_2)_9CH_2CH_2Si(OR)_3$, $CF_3(CF_2)_9CH_2CH_2RSi(OR)_2$, $CF_3(CF_2)_9CH_2CH_2SiCl_3$ and $CF_3(CF_2)_9CH_2CH_2RSiCl_2$. It is to be noted that "R" represents $CH_3$, $C_2H_5$ or $C_3H_7$.

As the diluting solvent, lower alcohol solvents, such as methanol, ethanol, isopropyl alcohol and the like having a carbon atom number of up to 6 are usable. In addition, ethers and ketones are also usable. Alcohol solvent containing isopropyl alcohol as main component is preferable due to easiness with which the water-repellent solution is diluted.

As the acid solution, solutions of inorganic acid, such as nitric acid solution, hydrochloric acid solution and sulfuric acid solution, having a concentration above 0.01N preferably within a range from 0.1N to 36N are usable. Furthermore, organic acid solutions, such as, acetic acid solution and citric acid solution are also usable.

Preferably, the mixing ratio of the water-repellent main material, the diluting solvent and the acid solution is 1:5–40:0.09–1.0 in wt. %.

In the following, the hydrolysis reaction and the condensation polymerization reaction of the fluoroalkyl-group contained silane compound will be described in detail.

(A) Hydrolysis Reaction:

Reacting with water under existence of acid catalyst, a fluoroalkylalkoxysilane (viz., fluoroalkyl-group contained silane compound) is easily hydrolyzed as is seen from the reaction formula (1). In order to complete the hydrolysis reaction, the stirring is continued for over 90 minutes, preferably about 120 minutes.

$$Rf-Si(OCH_3)_3 + 3H_2O \rightarrow Rf-Si(OH)_3 + 3MeOH \quad (1)$$

catalyst: acid catalyst (nitric acid)

If the concentration of the water-repellent material is smaller than 20%, the subsequent condensation polymerization reaction of the solution becomes very delayed as compared with case of other alkoxysilane compounds, such as tetraethoxysilane, methyltriethoxysilane and the like. That is, when the concentration is low, almost of products in the solution are monomers, making the gelation difficult.

The products (viz., monomers) of the above-mentioned hydrolysis reaction perform a dehydration condensation polymerization with silanol-group (—SiOH) on a glass substrate to be fixed thereto.

However, due to the bulky nature of fluoroalkyl-group (which will be referred to as "Rf" hereinafter for ease of description), the condensation polymerization reaction between the fluoroalkyl-group contained silane compounds (which will be referred to as "FAS" hereinafter) is slowly advanced, and thus actually, monomers are selectively reacted with the silanol-group on the glass substrate. This phenomenon becomes marked as the chain of "Rf" (viz., fluoroalkyl-group) increases. However, if the removal of water content from the water-repellent solution is enforcedly made by using a dehydrating agent (synthetic zeolite) or the like, the chemical equilibrium represented by the reaction formula (2) is advanced rightward. With this, the dehydration condensation polymerization is accelerated allowing formation of dimers and trimers in the water-repellent solution.

(a) Reaction with the Glass Substrate (2)

Fixing of Rf-group to glass substrate

(B) Condensation Polymerization Reaction:

(b) Reaction Between "FASs"

Due to this reaction, polymerization degree is increased.

(Dimerization)

(3)

(Trimerization)

(4)

Preferably, the water content in the water-repellent solution is smaller than 4000 ppm. The water content is measured by means of, for example, Karl Fischer titration method.

As the dehydrating agent, silica gel, synthetic zeolite (molecular sieve), activated alumina and the like are usable.

As the substrate, a glass plate, plastic plate, ceramic plate and the like each having on its surface activated hydrogen such as hydroxyl group "—OH" are usable. If the substrate is of a type having no activated hydrogen thereon, the substrate may be applied with a plasma treatment and/or a corona treatment to put thereon the activated hydrogen (viz., —OH).

As the glass substrate, a float glass plate produced through a float method and a rolled-out glass plate produced through a roll-out method are preferable in forming thereon a water-repellent film. It is to be noted that the glass plates of these types are also usable in the invention even when curved, colored, tempered and/or lined with other bedding layer. The water-repellent film may be applied to both surfaces of the glass substrate.

The relative humidity at the time when the water-repellent solution is being applied to the glass substrate is preferably between 15% and 75%. With the humidity of this range, the reaction between the hydroxyl-group of the water-repellent solution and the silanol-group of the glass substrate is effectively carried out.

In case of the glass plates, the water-repellent film (more specifically, the water-repellent solution) is applied preferably to a top (viz., fire-polished) surface thereof which has faced to a heat source during the production process of the glass plate by the float technique. However, if needed, the film may be applied to the other surface, viz., bottom surface of the glass plate.

Before being applied with the water-repellent solution, a surface of the glass substrate is subjected to polishing and acid treatments for its reforming. With this reforming, the strength of the water-repellent film formed on the surface is increased.

The polishing and acid treatments are made as follows.

For the polishing treatment, abrasive powder having an average particle size smaller than 5 $\mu$m, preferably, smaller than 1 $\mu$m is used, which contains cerium oxide (ceria), aluminum oxide (alumina) and/or silicon dioxide as main component. Using dried or wet brush, sponge and/or cloth, the abrasive powder is rubbed over the surface of the glass substrate for polishing the same. Of course, by changing the abrasive powder, rubbing force and/or rubbing time, the degree of polishing of the surface of the glass substrate can be adjusted.

Then, the polished glass substrate is subjected to the acid treatment using inorganic or organic acid solution of about pH 4. As is described hereinabove, the inorganic acid solution is nitric acid solution, hydrochloric acid solution and/or sulfuric acid solution, and the organic solution is acetic acid solution, formic acid solution and/or oxalic acid solution. Preferably, during the acid treatment, the acid solution is kept at a temperature between about 5° C. and about 70° C., and the glass substrate is kept dipped in the acid solution for a time of about 10 seconds to 10 minutes. With this acid treatment, extraction of sodium ions and scission of siloxane bonding on the polished surface of the glass substrate take place effectively thereby to effectively form silanol-group which contributes to an after-mentioned fixation of fluoroalkyl-group.

If desired, in place of the above-mentioned dipping method wherein the polished glass substrate is dipped in the acid solution, other known methods, such as spray method and flow method, may be used. That is, in the spray method, the acid solution is splayed over the polished surface, and in the flow method, the acid solution is flowed over the polished surface.

For applying the water-repellent solution onto the glass substrate, various known methods are usable, which are for example rubbing method (viz., hand painting method), nozzle-flow coating method, dipping method, splaying method, reverse-coating method, flexo-method, printing method, flow coating method and spin-coating method. Of course, for the solution application, some of these methods may be used in combination.

For strengthening the water-repellent film formed on the glass substrate, it is preferable to heat the substrate at about 80 to 350° C. for about 1 to about 60 minutes. With this heating, the film can be cured sufficiently.

Furthermore, if desired, before application of the water-repellent solution thereonto, the surface of the glass substrate may be applied with a bedding layer having a minutely rough surface. Due to the rough surface of the bedding layer, the bonding or adhesion between the water-repellent film thus formed and the glass substrate is increased. One of known methods of forming such bedding layer on a surface of the glass substrate is as follows. That is, at least two selected from a group consisting of metal alkoxide-system compounds and metal acetylacetonate-system compounds, which have different mean molecular weights, are mixed with a solvent to prepare a coating solution, and the coating solution is applied to a surface of the glass substrate and cured under a certain condition. Some of the known methods are disclosed in Japanese Patent First Provisional Publications 5-147976, 6-298545, 7-138050, 8-40748, and U.S. Pat. Nos. 5,403,368, 5,413,865 and 5,674,625.

The water-repellent film thus produced in the above-mentioned manner shows adequate performance in water-repellency, wear and abrasion resistance, durability, hardness, adhesive property to the glass substrate, and shows a long life water-repellent performance with a water-drop contact angle greater than about 95 degrees.

To develop the water-repellent solution of the first embodiment of the present invention, many examples and references were prepared and tested by the inventors, which are as follows.

EXAMPLE-1

To produce a water-repellent solution of this example, the following steps were carried out.

As a main material (viz., water-repellent) of the water-repellent solution, a fluoroalkylalkoxysilane $(CF_3(CF_2)_7CH_2CH_2Si(OCH_3)_3$ which will be referred as "FAS" hereinafter), that is, TSL8233 (trade name) of Toshiba silicone Co. was used. As the diluting solvent, isopropyl alcohol (which will be referred to as "i-PA") of Kishida Kagaku Co. was used, and as the acid catalyst, 0.1 N nitric acid solution (Kishida Kagaku Co.) was used. They were mixed at 1:25:0.3 in wt. % and stirred for about 2 hours at room temperature, to complete a hydrolysis reaction.

Then, the solution was added with 5 g of synthetic zeolite (Molecular Sieve 4A (trade name) of Kishida Kagaku Co.) and kept for about 18 hours for advancing condensation polymerization and dehydration. Then, the solution was filtrated by a filter paper (No. 7 of Advanteh Co.) to remove the Molecular Sieve 4A, thereby to produce a water-repellent solution of the example-1.

To produce a substrate to which the water-repellent solution was to be applied, the following steps were carried out.

A float glass plate of a size 200 mm×300 mm×3.5 mm was prepared. By using a brush and a polishing liquid containing abrasive powder, a top surface of the glass plate was polished, and after removing the abrasive powder from the polished surface, the glass plate was dipped in 0.1 N sulfuric acid solution of 35° C. for about 1 minute. The polishing liquid was a suspension prepared by mixing MIREK A-(A+B) (trade name: Mitsui Kinzoku Kogyo Co.) with water by 1:100 in weight. Then, the glass plate was washed with water by a washing machine, and dried. Then, the glass plate was then kept in an atmosphere of 23° C. and of a relative humidity of 45%.

With this atmosphere kept, 2 ml of the water-repellent solution was dropped onto the polished surface of the glass plate, and spread over the entire surface using a cotton cloth (Bemcott (trade name)), and thereafter dried in air for about 5 minutes. Then, the dried glass plate was put into a muffle furnace and heated (for curing) in such a way that the temperature of the glass plate reached to about 140° C. within about 5 minutes. After being pulled out from the furnace, the glass plate was wiped several times with a cotton cloth damped with isopropyl alcohol for removing any residual of the solution therefrom. With this, a transparent glass plate, that is, a glass plate substrate with a water-repellent film formed thereon was prepared.

Then, the glass plate thus prepared was subjected to performance tests.

Polymerization Degree Measurement:

The polymerization degree of the water-repellent solution (viz., example-1) was measured under the following condition.

Measuring method: Gel permeation chromatography method (which will be referred to as "GPC" hereinafter)

Measuring apparatus: High speed GPC device (Tohso Co.,)

Columns: Four columns (TSKgelG4000H-HR, G3000H-HR, G2000H-HR & G2000H-HR (trade names of Tohso Co.,)) connected in series, each being 30 cm in length and kept 40° C. during measurement.

Detector: Differential refractometer kept 38° C. during measurement.

Eluate: Tetrahydrofuran (flow rate: 1 litter/min.)

Amount of water-repellent solution injected: 50 $\mu$l

For preparing a sample of the water-repellent solution, the solution was added with trimethylchlorosilane (($CH_3$)$_3$SiCl:TMCS) for causing the hydrolysis and condensation polymerization products of "FAS" in the solution to react with "TMCS" and then the solution was filtrated using a 0.5 $\mu$m-pore size filter. This was made for inactivating silanol-group in the solution. That is, 5 g of the water-repellent solution and 0.57 g of "TMCS" were mixed together and stirred for about 1 hour at room temperature. A "GPC" chart thus provided as a result of this GPC-measurement revealed that the dehydrated water-repellent solution has monomers, dimers, trimers, tetramers and pentamers of "FAS" and identified that the retention times (RT) of them were 32.5, 30.8, 29.9 and 29.3 to 28.5 minutes.

The existing ratio of each polymer was derived from a rate of the corresponding peak area. That is, for example, the existing ratio ($\eta$) of the trimers relative to the dimers was calculated from the division "(peak area of trimers)/(peak area of dimers)". It is to be noted that this calculation was made on the assumption that the refractive index of monomers, dimers, trimers, tetramers and higher-degrees polymers (viz., pentamers, hexamers, . . . ) do not change.

Water-Repellent Test:

Measuring apparatus: CA-X200 type (trade name) (Kyowa Kaimen kagaku Co.)

Measuring environment: in atmosphere (about 25° C.)

Water: pure water

Evaluation method: after dropping 2 $\mu$l of pure water onto a surface of a glass plate, a contact angle of the drop relative to the surface was measured. It is to be noted that in the following, the water drop contact angle before the performance test is represented by "$\theta_0$ (°)" and the water drop contact angle after the performance test is represented by "$\theta$ (°)".

Abrasion Resistance Test:

Testing machine: Traverse type rubbing tester (Central Glass Co.)

Test piece size: about 200 mm× about 300 mm

Load on a friction cloth (canvas cloth): 0.1 Kg/cm$^2$ (JIS L3102-1961-1206)

Stroke: 100 mm (reciprocating sliding movement)

Sliding speed: 30 reciprocation/minute

Evaluation method: After a test piece was subjected to a 3500 reciprocation rubbing test, a contact angle "$\theta$ (°)" of a pure water drop on the test piece was measured.

The results of the above-mentioned tests are shown in TABLE-1 (see page 32). As shown in this table, in the example-1, the $\eta$-value (that is, existing ratio of the trimers relative to the dimers) was 0.25, and the abrasion resistance (viz., traverse resistance) was excellent showing above 95 degrees in water drop contact angle. The water content in the water-repellent solution was about 660 ppm. It is to be noted that double circles in the column of "Abrasion resistance" represent "excellent", single circles represent "good" and crosses "X" represent "no good".

EXAMPLE-2

The process of preparing this example was the same as that of the above-mentioned example-1 except that in the example-2, the dehydration time was about 6 hours. As is seen from TABLE-1 (see page 32), the $\eta$-value was 0.17, and the abrasion resistance (viz., traverse resistance) was "excellent" showing above 95 degrees in water drop contact angle. The water content in the water-repellent solution was about 1420 ppm.

EXAMPLE-3

The process of preparing this example was the same as that of the above-mentioned example-1 except that in the example-3, the dehydration time was about 4 hours. As is seen from TABLE-1 (see page 32), the $\eta$-value was 0.11, and the abrasion resistance (viz., traverse resistance) was "excellent" showing above 95 degrees in water drop contact angle. The water content in the water-repellent solution was about 2210 ppm.

EXAMPLE-4

The process of preparing this example was the same as that of the above-mentioned example-1 except that in the example-4, the dehydration time was about 2.5 hours. As is seen from TABLE-1 (see page 32), the $\eta$-value was 0.08, and the abrasion resistance (viz., traverse resistance) was "good" showing 90 to 95 degrees in water drop contact angle. The water content in the water-repellent solution was about 2780 ppm.

Reference-1

The process of preparing this reference was the same as the above-mentioned example-1 except that in this reference, the dehydration time was zero (0). As is seen from TABLE-1 (see page 32), the $\eta$-value was 0 (zero), and the abrasion resistance (viz., traverse resistance) was "no good" showing below 90 degrees in water drop contact angle. The water content in the water-repellent solution was about 9770 ppm.

Reference-2

The process of preparing this reference was the same as the above-mentioned example-1 except that in this reference, the dehydration time was 0.75 hours. As is seen from TABLE-1 (see page 32), the $\eta$-value was 0.02, and the abrasion resistance (viz., traverse resistance) was "no good" showing below 90 degrees in water drop contact angle. The water content in the water-repellent solution was about 5240 ppm.

Reference-3

The process of preparing this reference was the same as the above-mentioned example-1 except that in this reference, the dehydration time was 1.5 hours. As is seen from TABLE-1 (see page 32), the η-value was 0.05, and the abrasion resistance (viz., traverse resistance) was "no good" showing below 90 degrees in water drop contact angle. The water content in the water-repellent solution was about 3600 ppm.

Figure 1:
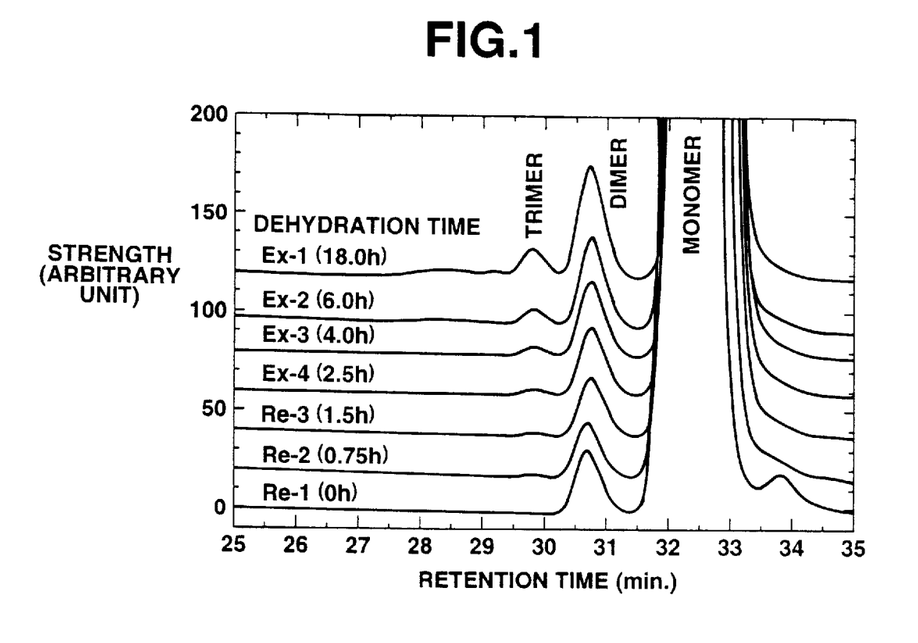
FIG. 1 is a GPC-chart showing results of GPC-measurement (viz., Gel Permeation Chromatography-measurement) applied to examples-1, -2, -3 and -4 and references -1, -2 and -3.

FIG. 1 is a GPC-chart showing the results of the GPC-measurement applied to the above-mentioned examples-1, -2, -3 and -4 and the references -1, -2 and -3.

From the above, it was revealed that the dehydration time and the abrasion resistance (viz., traverse resistance) have a certain mutual relation which will be described in the following.

That is, in the samples wherein the dehydration time was 0 (zero) or the time was very short (for example 1.5 hours), the GPC-chart showed no peaks caused by trimers of "FAS" at the retention time (RT) of 29.9 minutes and by polymers such as tetramers, pentamers and higher-degrees polymers (viz., hexamers, . . . ) of "FAS" at the retention time (RT) of 28.5 to 29.3 minutes. While, in the samples wherein the dehydration time was longer than 2.5 hours, the GPC-chart showed the peaks caused by the trimers. And, with increase of the dehydration time, the peak of the trimers was increased gradually and peaks of tetramers, pentamers and higher-degrees polymers (viz., hexamers, . . . ) appeared.

From the above, it was revealed that for obtaining a satisfaction in abrasion resistance (that is, obtaining above 90 degrees in water drop contact angle), formation of higher-degrees polymers is needed. That is, it was revealed that in formation of trimers, the η-value (viz., existing ratio of the trimers of FAS in the water-repellent solution relative to the dimers) should be at least 0.06, that is, equal to or greater than 0.06.

EXAMPLE-5

The process of preparing this example was the same as that of the above-mentioned example-1 except that in the example-5, the water-repellent solution was kept in a storage place for three days. As is seen from TABLE-1 (see page 32), the η-value was 0.29, and the abrasion resistance (viz., traverse resistance) was "excellent" showing above 95 degrees in water drop contact angle. The water content in the water-repellent solution was about 1250 ppm.

EXAMPLE-6

The process of preparing this example was the same as that of the above-mentioned example-1 except that in the example-6, the water-repellent solution was kept in a storage place for six days. As is seen from TABLE-1 (see page 32), the η-value was 0.41, and the abrasion resistance (viz., traverse resistance) was "good" showing 90 to 95 degrees in water drop contact angle. The water content in the water-repellent solution was about 1570 ppm.

Reference-4

The process of preparing this reference was the same as that of the above-mentioned example-1 except that in the reference-4, the water-repellent solution was kept in a storage place for nine days. As is seen from TABLE-1 (see page 32), the η-value was 0.52, and the abrasion resistance (viz., traverse resistance) was "no good" showing below 90 degrees in water drop contact angle. The water content in the water-repellent solution was about 2360 ppm.

Figure 2:
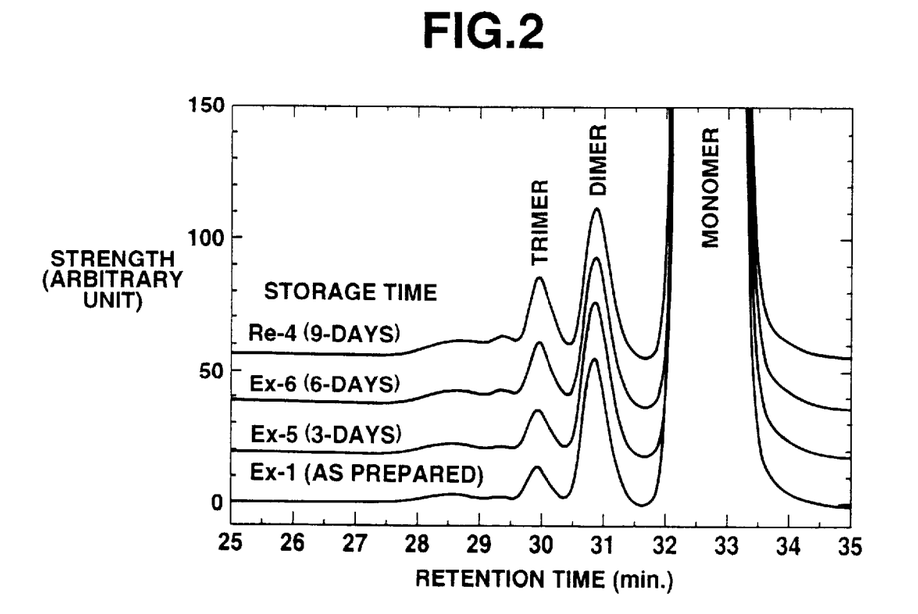
FIG. 2 is a GPC-chart showing results of GPC-measurement applied to examples -1, -5 and -6 and reference-4.

FIG. 2 is a GPC-chart showing the results of the GPC-measurement applied to the above-mentioned examples -5 and -6 and the reference-4. For comparison, the result of the measurement applied to the example-1 wherein the storage time of the water-repellent solution was 0 (zero) is also shown in the chart.

From the above, it was revealed that the storage time and the abrasion resistance (viz., traverse resistance) have a certain mutual relation which will be described in the following.

That is, with increase of the storage time of the water-repellent solution, the peaks of higher-degrees polymers of "FAS" were gradually increased. That is, with increase of the storage time, the water content was also increased and the condensation polymerization occured, and the acceleration of the condensation polymerization induced by addition of the dehydrating agent was still continued even after removal of the dehydrating agent. While, when the retention time exceeded 9 days, the abrasion resistance (viz., traverse resistance) became very poor.

From the above, it was revealed that for obtaining a satisfaction in abrasion resistance, the condensation polymerization of "FAS" should be controlled in a certain range, that is, the η-value should satisfy the inequality of "$0.06 \leq \eta \leq 0.5$".

EXAMPLE-7

The process of preparing this example was the same as that of the above-mentioned example-1 except that in the example-7, ethanol (EtOH) was used as the diluting solvent. As is seen from TABLE-1 (see page 32), the η-value was 0.18, and the abrasion resistance (viz., traverse resistance) was "excellent" showing above 95 degrees in water drop contact angle.

EXAMPLE-8

The process of preparing this example was the same as that of the above-mentioned example-1 except that in the example-8, butanol (n-BuOH) was used as the diluting solvent. As is seen from TABLE-1 (see page 32), the η-value was 0.26, and the abrasion resistance (viz., traverse resistance) was "excellent" showing above 95 degrees in water drop contact angle.

EXAMPLE-9

The process of preparing this example was the same as that of the above-mentioned example-1 except that in the example-9, acetone was used as the diluting solvent. As is seen from TABLE-1 (see page 32), the η-value was 0.30, and the abrasion resistance (viz., traverse resistance) was "excellent" showing above 95 degrees in water drop contact angle.

Reference-5

The process of preparing this reference was the same as that of the above-mentioned example-1 except that in the reference-5, methanol (MeOH) was used as the diluting solvent. As is seen from TABLE-1, the η-value was 0.02, and the abrasion resistance (viz., traverse resistance) was "no good".

Figure 3:
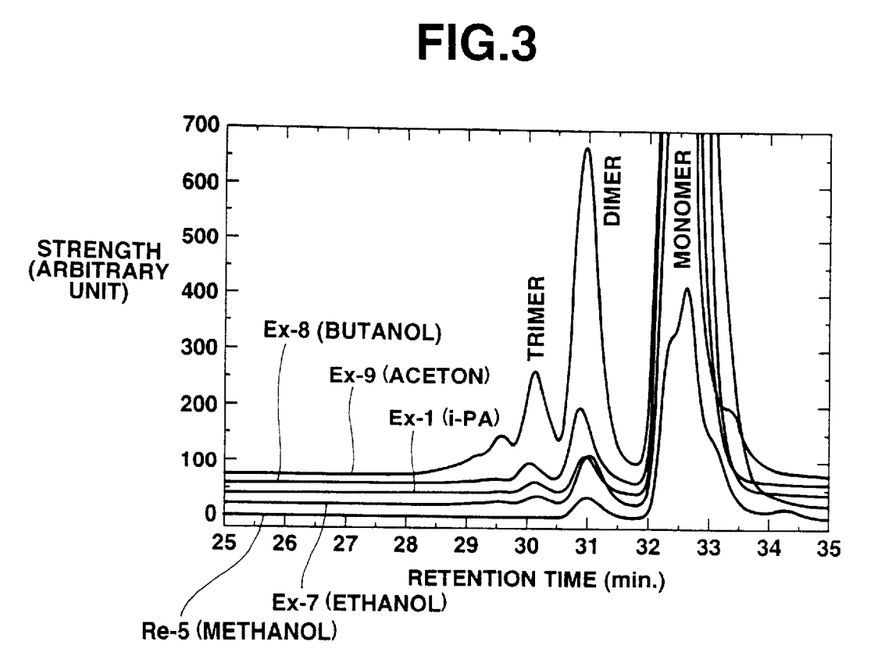
FIG. 3 is a GPC-chart showing results of GPC-measurement applied to examples -1, -7, -8 and -9 and reference-5.

FIG. 3 is a GPC-chart showing the results of the GPC-measurement applied to the above-mentioned examples -7, -8 and -9 and the reference-5. For comparison, the result of the measurement applied to the example-1 wherein isopropyl alcohol (i-PA) was used as the diluting solvent is also shown in the chart.

From the above, it was revealed that the type of the diluting solvent and the abrasion resistance (viz., traverse resistance) have a certain mutual relation which will be described in the following.

That is, in the samples wherein the diluting solvent was other than methanol, the GPC-chart clearly showed peaks caused by trimers at and around the retention time (RT) of 29.9 minutes and by polymers such as tetramers, pentamers and higher-degrees polymers (viz., hexamers, . . . ) at the retention time (RT) of 28.5 to 29.3 minutes. The η-value was within a range from 0.06 to 0.5. While, in the samples wherein methanol was used as the diluting solvent, the GPC-chart showed substantially no peaks caused by trimers, tetramers, pentamers and higher-degrees polymers (viz., hexamers, . . . ), and the η-value was about 0.02. In the samples wherein the diluting solvent was other than methanol, the abrasion resistance (viz., traverse resistance) was as good as 101 to 106 degrees in water drop contact angle. While, in the samples wherein methanol was used as the diluting solvent, the abrasion resistance was remarkably lowered, showing 78 to 104 degrees in water drop contact angle.

From the above, it was revealed that for obtaining a satisfaction in abrasion resistance, formation of higher-degrees polymers is needed. That is, it was revealed that in formation of trimers, the η-value should be controlled within a range from 0.06 to 0.5.

EXAMPLE-10

The process of preparing this example was the same as that of the above-mentioned example-1 except that in the example-10, as the water-repellent agent, XC95-A9715 (trade name: Toshiba silicone Co.), that is, (heptadecafluorodecyltriisopropoxysilane: $(CF_3(CF_2)_7CH_2CH_2Si(OC_3H_7)_3))$ was used, as the diluting solvent, ethanol (EtOH) was used and the dehydrating time was about 16 hours. As is seen from TABLE-1 (see page 32), the η-value was 0.21, and the abrasion resistance (viz., traverse resistance) was "excellent" showing above 95 degrees in water drop contact angle.

EXAMPLE-11

The process of preparing this example was the same as that of the above-mentioned example-10 except that in the example-11, the diluting solvent was butanol (n-BuOH). As is seen from TABLE-1 (see page 32), the η-value was 0.38, and the abrasion resistance (viz., traverse resistance) was "excellent" showing above 95 degrees in water drop contact angle.

Reference-6

The process of preparing this example was the same as that of the above-mentioned example-10 except that in the reference-6, the diluting solvent was isopropyl alcohol (i-PA). As is seen from TABLE-1 (see page 32), the η-value was 0 (zero) and the abrasion resistance (viz., traverse resistance) was "no good".

Figure 4:
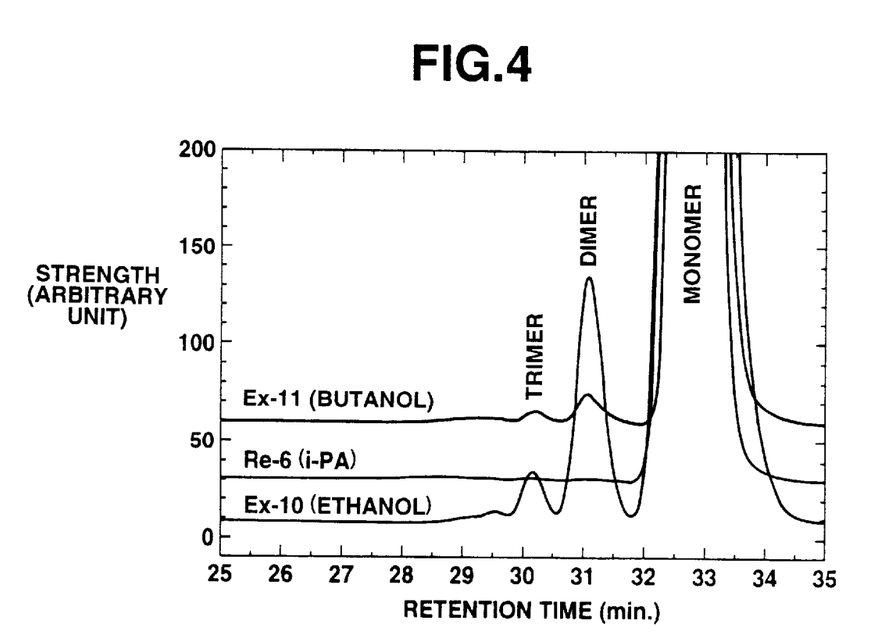
FIG. 4 is a GPC-chart showing results of GPC-measurement applied to examples -10 and -11 and reference-6.

FIG. 4 is a GPC-chart showing the results of the GPC-measurement applied to the above-mentioned examples -10 and -11 and the reference-6.

From the above, it was revealed that the type of the water-repellent, the type of diluting solvent and the abrasion resistance (viz., traverse resistance) have a certain mutual relation which will be described in the following.

That is, in the samples wherein the diluting solvent was isopropyl alcohol (viz., alcohol having alkoxy-group possessed by a fluoroalkyl-group contained silane used as a main material of the water-repellent solution), the GPC-chart showed only peaks caused by monomers at the retention time (RT) of 32.5 minutes, and showed no peaks caused by trimers at the retention time of 29.9 minutes and by polymers such as tetramers, pentamers and higher-degrees polymers (viz., hexamers, . . . ) at the retention time of 28.5 to 29.3 minutes. While, in the samples wherein the diluting solvent was ethanol or n-butanol, the GPC-chart showed the peaks caused by trimers, tetramers, pentamers and higher-degrees polymers (viz., hexamers, . . . ). The η-value was 0.21 in the sample wherein ethanol was used and 0.38 in the sample wherein n-butanol was used. In the sample wherein isopropyl alcohol was used as the diluting solvent, the abrasion resistance (viz., traverse resistance) was very poor showing only 58 to 92 degrees in water drop contact angle. While, in the sample wherein ethanol or n-butanol was used as the solvent, the abrasion resistance was excellent showing 103 to 106 or 95 to 105 in water drop contact angle.

From the above, it was revealed that for obtaining a satisfaction in abrasion resistance, formation of higher-degrees polymers of "FAS" is needed. That is, it was revealed that in formation of trimers, the condensation polymerization of "FAS" should be controlled in a given range, that is, the η-value should satisfy the inequality of "$0.06 \leq \eta \leq 0.5$".

TABLE-2 (see page 33) shows respective existing ratio of monomers, dimers, trimers, tetramers and higher-degrees polymers (viz., pentamers, hexamers, . . . ) of "FAS" in two dehydrated water-repellent solutions which were adjusted by using isopropyl alcohol (example-1) and acetone (example-9) respectively. In fact, the existing ratio was estimated from the area possessed by the peak shown in the GPC-chart. From the TABLE-2 (see page 33), it was revealed that for obtaining a satisfaction in abrasion resistance, the existing ratio of monomers, dimers, trimers, tetramers and higher-degrees polymers (viz., pentamers, hexamers, . . . ) of "FAS" should be greater than 60 wt. %, smaller than 25 wt. %, smaller than 12.5 wt. % and smaller than 5 wt. %, respectively.

In the following, a second embodiment of the present invention will be described.

For producing a water-repellent solution of the second embodiment, the following production process is executed.

That is, as will be described in detail hereinafter, a fluoroalkyl-group contained silane compound as a main water-repellent material, a solvent as a diluting solution and an acid solution as a catalyst are mixed at a given mixing ratio, and stirred for a given time to complete a hydrolysis reaction. Then, with addition of a dehydrating agent, the solution is subjected to a dehydration treatment for a given time to establish a condensation polymerization.

Similar to the above-mentioned first embodiment, as the water-repellent main material, fluoroalkylalkoxysilane-system compounds or fluoroalkylhalidesilane-system compounds are usable. However, in the second embodiment, the compounds are, for example, $CF_3(CH_2)_9CH_2CH_2Si(OR)_3$, $CF_3(CF_2)_{10}CH_2CH_2Si(OR)_3$, $CF_3(CF_2)_{11}CH_2CH_2SiR(OR)_3$, $CF_3(CF_2)_{12}CH_2CH_2Si(OR)_3$, $CF_3(CF_2)_9CH_2CH_2SiR(OR)_2$, $CF_3(CF_2)_{10}CH_2CH_2SiR(OR)_2$, $CF_3(CF_2)_{11}CH_2CH_2SiR(OR)_2$, $CF_3(CF_2)_{12}CH_2CH_2SiR(OR)_2$, $CF_3(CF_2)_7CH_2CH_2Si(OR)_3$, $CF_3(CF_2)_7CH_2CH_2SiCl_3$, $CF_3(CF_2)_9CH_2CH_2SiCl_3$, $CF_3(CF_2)_9CH_2CH_2SiRCl_2$, $CF_3(CF_2)_{10}CH_2CH_2SiCl_3$ and $CF_3(CF_2)_{10}CH_2CH_2SiRCl_2$. It is to be noted that "R" represents $CH_3$, $C_2H_5$ or $C_3H_7$.

Considering the easiness in producing the water-repellent solution and the performance of a water-repellent film provided by the solution, the value "m" in the following general chemical formula (5) of the fluoroalkyl-group contained silane compound is preferably in a range from 7 to 11.

$$CF_3(CF_2)_m(CH_2)_2SiX_3 \qquad (5)$$

As the diluting solvent, lower alcohol solvents, such as methanol, ethanol, isopropyl alcohol and the like having less than six carbons are usable. In addition, ethers and ketones are also usable. Alcohol solvent containing isopropyl alcohol as main component is preferable due to easiness with which the coating solution is diluted.

As the acid solution, solutions of inorganic acid, such as nitric acid solution, hydrochloric acid solution and sulfuric acid solution, having a concentration above 0.1N preferably with a range from 0.1N to 36N are usable. Furthermore, organic acid solutions, such as, acetic acid solution and citric acid solution are also usable.

Preferably, the mixing ratio of the water-repellent main material, the diluting solvent and the acid solution is 1:5–40:0.09–1.0 in wt.

Since the hydrolysis reaction and condensation polymerization reaction of the fluoroalkyl-group contained silane compounds have been described in detail in the part of the first embodiment, explanation of the same will be omitted in this second embodiment for simplification of description. That is, also in this second embodiment, chemical reactions substantially the same as those represented by the above-mentioned reaction formulas (1), (2), (3) and (4) are carried out.

Like in the first embodiment, the water content in the water-repellent solution is preferably smaller than 4000 ppm, and as the dehydrating agent, silica gel, synthetic zeolite, activated alumina and the like are usable, in this second embodiment. Furthermore, like in the first embodiment, as the substrate, glass plate, plastic plate, ceramic plate and the like each having on its surface activated hydrogen such as hydroxyl group "—OH" are usable. Like in the first embodiment, the relative humidity at the time when the water-repellent solution is being applied to the glass substrate is preferably between 15% and 75%. Polishing and acid treatments of the glass substrate are the same as those in the first embodiment.

The water-repellent film produced on the glass substrate from the water-repellent solution of the second embodiment shows a satisfied performance in water-repellency, wear and abrasion resistance, durability, sunshine resistance and chemical resistance. It was revealed that this excellency of the water-repellent film is due to usage of the fluoroalkyl-group contained compound of the type which has long-chain fluoroalkyl-groups (viz., $m \geq 9$) contained therein.

To develop the water-repellent solution of the second embodiment of the present invention, five examples were prepared and tested, which are as follows.

EXAMPLE-12

To produce the water-repellent solution of this example, the following steps were carried out.

As a main material (viz., water-repellent) of the water-repellent solution, a henicosanefluorododecyltrimethoxysilane ($CF_3(CF_2)_9CH_2CH_2Si(OCH_3)_3$: trial product, which will be referred to as "FAS-9" hereinafter) was used. As the diluting solvent, isopropyl alcohol (viz., i-PA) was used, and as the acid catalyst, 0.1N nitric acid solution was used. They were mixed at 1:25:0.3 in wt. and stirred for about 2 hours at room temperature to complete a hydrolysis reaction.

Then, the solution wad added with synthetic zeolite (Molecular Sieve 4A: trade name) in an amount five times as much as the water-repellent material and kept for about 16 hours for advancing condensation polymerization and dehydration. Then, the solution was filtrated by a filter paper (No. 7 of Advateh Co.) to remove the Molecular Sieve 4A, thereby to produce a water-repellent solution of the example-12.

To produce a substrate to which the water-repellent solution was to be applied, the following steps were carried out.

A float glass plate of a size 200 mm×300 mm×3.5 mm was prepared. By using a brush and a polishing liquid containing abrasive powder, a top surface of the glass plate was polished, and after moving the abrasive powder from the polished surface, the glass plate was dipped in 0.1 N sulfuric acid solution of 35° C. for about 1 minute. Then, the glass plate was washed with water by a washing machine and then dried.

Then, in an atmosphere of 22° C. and of a relative humidity of 45%, the water-repellent solution was applied to the dried polished surface of the glass plate by hand painting. The glass plate thus applied with the solution was dried in air and thereafter heated at 140° C. for about 5 minutes. Then, for removing any residual of the solution, the glass plate was wiped several times with a cotton cloth damped with isopropyl alcohol. With this, a glass plate with a water-repellent film formed thereon was prepared.

Then, the glass plate thus prepared was subjected to performance tests, which were a water-repellent test, an abrasion resistance test, a sunshine resistance test and alkali-resistance test which will be described hereinafter.

Polymerization Degree Measurement:

The polymerization degree of the water-repellent solution (viz., example-12) was measured under the following condition.

Measuring method: Gel permeation chromatography method (which will be referred to as "GPC" hereinafter)

Measuring apparatus: High speed GPC device (Tohso Co.,)

Columns: Four columns (TSKgelG4000H-HR, G3000H-HR, G2000H-HR & G2000H-HR (trade names of Tohso Co.,)) connected in series, each being 30 cm in length and kept 40° C. during measurement.

Detector: Differential refractometer kept 38° C. during measurement.

Eluate: Tetrahydrofuran (flow rate: 1 litter/min.)

Amount of water-repellent solution injected: 50 μl

For preparing a sample of the water-repellent solution, the solution was added with trimethylchlorosilane (($CH_3$)$_3$SiCl:TMCS) for causing the hydrolysis and condensation polymerization products of "FAS" in the solution to react with "TMCS" and then the solution was filtrated using a 0.5 μm-pore size filter. This was made for inactivating silanol-group in the solution. That is, 5 g of the water-repellent solution and 0.57 g of "TMCS" were mixed together and stirred for about 1 hour at a room temperature. A "GPC" chart thus provided as a result of this GPC-measurement revealed that the dehydrated water-repellent solution has monomers, dimers, trimers, tetramers and pentamers of "FAS" and identified that the retention times (RT) of them were 32.5, 30.8, 29.9 and 29.3 to 28.5 minutes.

Figure 5:
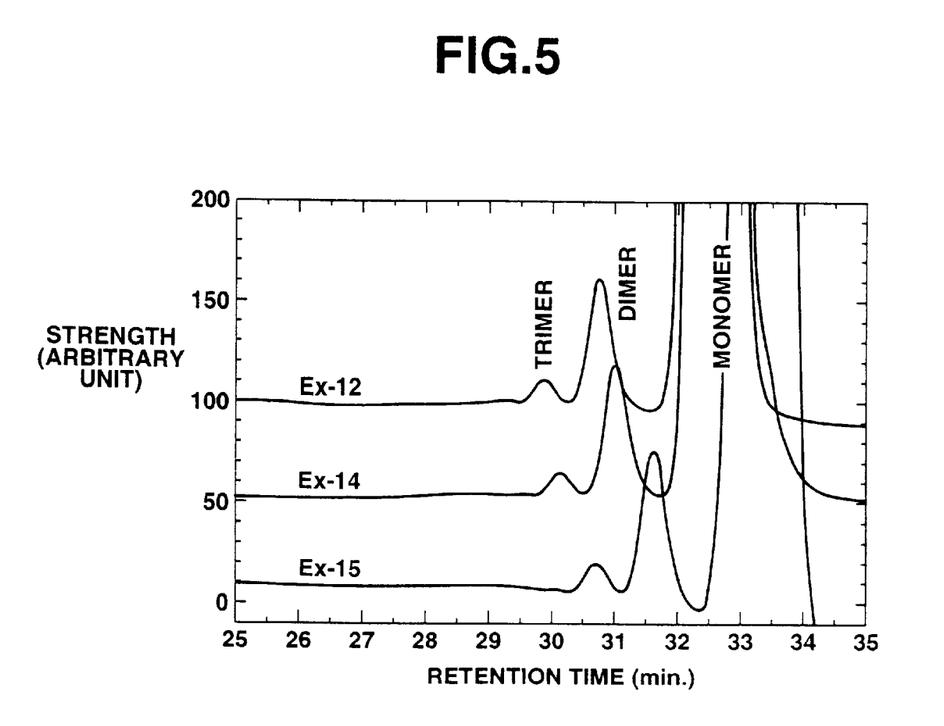
FIG. 5 is a GPC-chart showing results of GPC-measurement applied to examples-12, -14 and -15.

It is to be noted that FIG. 5 is a GPC-chart showing the results of the GPC-measurement applied to the example-12 and after-mentioned examples-14 and -15. As is seen from this chart, the example-12 showed clear peaks of monomers, dimers and trimers.

Water-Repellent Test:

Measuring apparatus: CA-X200 type (trade name) (Kyowa Kaimen kagaku Co.)

Measuring environment: in atmosphere (about 25° C.)

Water: pure water

Evaluation method: after dropping 2 μl of pure water onto a glass plate, a contact angle of the drop relative to the glass plate was measured.

Abrasion Resistance Test:

Testing machine: Traverse type rubbing tester (Central Glass Co.)

Test piece size: about 100 mm×about 200 mm

Friction cloth: Canvas cloth

Load on a friction cloth: 0.1 Kg/cm$^2$ (JIS L3102-1961-1206)

Stroke: 100 mm (reciprocating sliding movement)

Sliding speed: 30 reciprocation/minute

Evaluation method: After a test piece was subjected to a 3500 reciprocation rubbing test, a contact angle "θ (°)" of a pure water drop on the test piece was measured.

Sunshine Resistance Test:

Testing machine: UV tester (SUV-W131 (trade name) Iwasaki Denki Co.)

UV irradiation intensity: 76 mW/cm$^2$

Atmosphere: 48° C., 20% (RH)

Evaluation method: Water drop contact angle was measured every 200 hours of UV irradiation, and the contact angle measured at the time of 600 hours of UV irradiation was used for evaluating the sunshine resistance.

Figure 6:
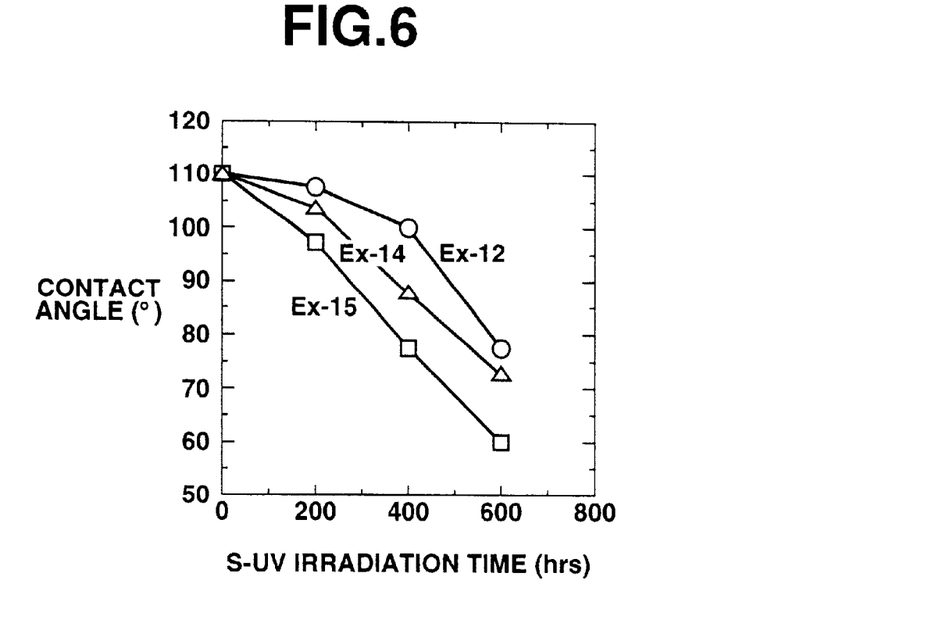
FIG. 6 is a graph showing results of sunshine resistance test applied to examples-12, -14 and -15.
Figure 7:
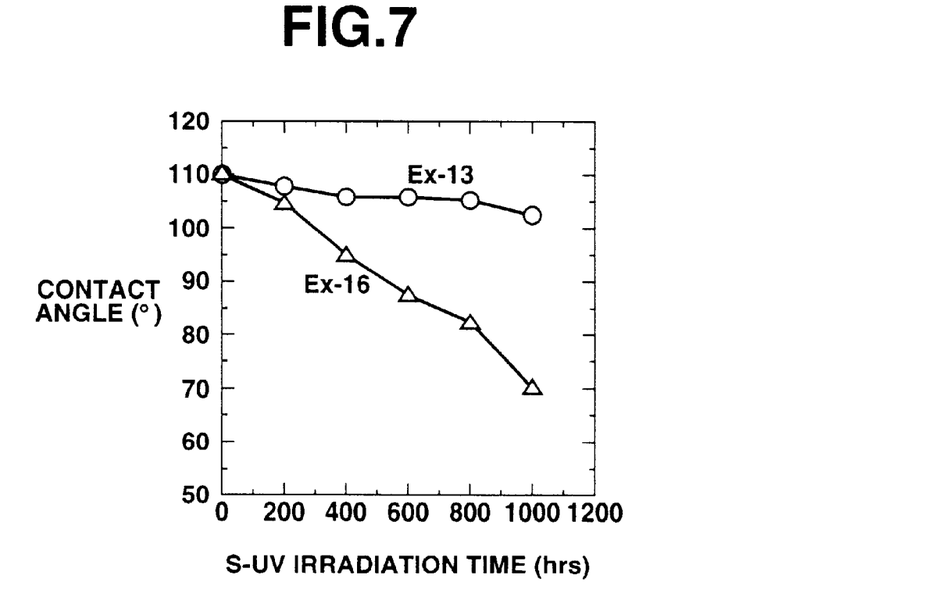
FIG. 7 is a graph showing results of sunshine resistance test applied to examples-13 and -16.

It is to be noted that FIG. 6 shows the results of sunshine resisting rest applied to the example-12 and after-mentioned examples-14 and -15 which had no bedding layer. It is further to be noted that FIG. 7 shows the result of sunshine resisting test applied to after-mentioned example-13 and example-16.

Alkali-Resistance Test:

Test method: several ml of the commercial car shampoo (scale removing shampoo sold by Wilson Co.: PH13) was dropped onto the glass plate. The glass plate was kept for about 24 hours at room temperature, washed with water, dried and then subjected to the water-repellent test.

As is seen from TABLE-3 (see page 33), the example-12 showed good results in all the performance tests, that is, in the abrasion resistance test (107 to 108 degrees in water drop contact angle), sunshine resistance test (80 degrees in water drop contact angle) and alkali resistance test (103 degrees in water drop contact angle).

EXAMPLE-13

The process of preparing this example was the same as that of the above-mentioned example-12. In other words, the water-repellent solution of example-12 was used in this example.

However, in the example-13, a glass plate to which the water-repellent solution was applied was different from that used in the example-12. That is, the glass plate used in the example-13 had a bedding layer having a minutely rough surface.

For forming the bedding layer on the glass plate, the following steps were carried out.

First, a coating solution was prepared in the following manner. A sol containing a tetraethoxysilane [Si(OC$_2$H$_5$)$_4$] polymer was mixed with tetrabutoxytitane [Ti(O-Bu)$_4$] stabilized by adding acetylacetone. The molar ratio, on oxide basis, of the tetrabutoxytinane to SiO$_2$ was about 20:100. The thus prepared mixture was diluted with isopropyl alcohol (i-PA) to adjust the solid matter concentration, on oxide basis, of the mixture to about 5 wt. %, thereby to obtain a sol "A". Separately, a sol containing methyltrimethoxysilane [CH$_3$Si(OCH$_3$)$_3$] was diluted with diluted with isopropyl alcohol (i-PA) to adjust the solid matter concentration, on oxide basis, of the mixture to about 20 wt. %, thereby to obtain a sol "B". Then, 20 g of the sol "A", 20 g of the sol "B" and 50 g of butanol were mixed together and stirred at about 50° C. for about 3 hours under a tight sealing condition, thereby to obtain a solution "C". Then, the solution "C" was diluted with about 360 g of an alcohol solvent containing about 324 g of isopropyl alcohol (i-PA: 90 wt. %) and about 36 g of butanol (n-BuOH: 10 wt. %). With these steps, the coating solution for the bedding layer was prepared.

Then, the coating solution thus prepared was applied to a glass plate substrate by a spin coating method. That is, the glass plate substrate was set to a spin coater, and the spin coater was rotated at 150 rpm and after three seconds of this rotation, the coating solution was dropped onto the glass plate substrate and the coater rotation was kept for about 18 seconds to form a liquid layer on the glass plate substrate. Then, the rotation of the coater was stopped for about 60 seconds to level the liquid layer, and then the coater was rotated at 50 rpm for about 40 seconds, With these steps, there was obtained a gel film on the glass plate substrate.

Then, the glass plate substrate having the gel film formed thereof was heated at about 250° C. for about 30 minutes and then heated at about 630° C. to about 660° C., thereby to obtain on the glass plate substrate a cured metal oxide (SiO$_2$—TiO$_2$) film having a minutely rough surface. The average surface roughness "Ra" of the film was about 6 nm.

Then, like the case of the example-12, the glass plate substrate thus having the bedding layer formed thereon was applied with the water-repellent solution in an atmosphere of 25° C. and of a relative humidity of 50% and then treated in substantially same manner as in the example-12. With this, a glass plate with a water-repellent film formed thereon was prepared.

The glass plate was subjected to the performance tests.

As is seen from TABLE-3 (see page 33), the example-13 showed good results in all the abrasion resistance test (110 to 112 degrees in water drop contact angle, sunshine resistance test (106 degrees in water drop contact angle) and alkali resistance test (105 degrees in water drop contact angle). Furthermore, as is seen from FIG. 7, the example-13 could show above 100 degrees even after UV irradiation of about 1,000 hours.

EXAMPLE-14

The process of preparing this example was the same as that of the above-mentioned example-12 except that in the example-14, heptadecafluorodecyltrimethoxysilane [CF$_3$(CF$_2$)$_7$CH$_2$CH$_2$Si(OCH$_3$)$_3$] (KBM-7803 (trade name) of Shinetsu Kagaku Co.) was used as the material of the water-repellent solution. As is seen, the heptadecafluorodecyltrimethoxysilane is one of fluoroalkylalkoxysilane-system compounds whose "m" is 7.

As is seen from TABLE-3 (see page 33) and FIG. 5, the example-14 showed somewhat lower performance as compared with the above-mentioned example-12.

EXAMPLE-15

The process of preparing this example was the same as that of the above-mentioned example-12 except that in the example-15, tridecafluorooctyltrimethoxysilane [CF$_3$(CF$_2$)$_5$CH$_2$CH$_2$Si(OCH$_3$)$_3$] (TSL8256 (trade name) of Toshiba Silicone Co) was used as the material of the water-repellent solution. As is seen, the tridecafluorooctyltrimethoxysilane is one of fluoroalkylalkoxysilane-system compounds whose "m" is 5.

As is seen from TABLE-3 (see page 33) and FIG. 5, similar to the above-mentioned example-14, the example-15 showed somewhat lower performance as compared with the above-mentioned example-12.

EXAMPLE-16

The process of preparing this example was the same as that of the above-mentioned example-13 except in the example-16, heptadecafluorodecyltrimethoxysilane [CF$_3$(CF$_2$)$_7$CH$_2$CH$_2$Si(OCH$_3$)$_3$] (KBM-7803 (trade name) of Shinetsu Kagaku Co.) was used as the material of the water-repellent solution.

As is seen from TABLE-3 (see page 33) and FIG. 7, the example-16 showed somewhat lower performance as compared with the example-13.

TABLE 1

|  | Solvent |  | Acid catalyst | Dehydration time (hrs) | Water content (ppm) | η-value | Abrasion resistance |
|---|---|---|---|---|---|---|---|
| Example-1 | FAS | i-PA | Nitric acid | 18.0 | 660 | 0.25 | ◎ |
| Example-2 | FAS | i-PA | Nitric acid | 6.0 | 1420 | 0.17 | ◎ |
| Example-3 | FAS | i-PA | Nitric acid | 4.0 | 2210 | 0.11 | ◎ |
| Example-4 | FAS | i-PA | Nitric acid | 2.5 | 2780 | 0.08 | ◯ |
| Example-5 | FAS | i-PA | Nitric acid | 18.0 | 1250 | 0.29 | ◎ |
| Example-6 | FAS | i-PA | Nitric acid | 18.0 | 1570 | 0.41 | ◯ |
| Example-7 | FAS | Ethanol | Nitric acid | 18.0 | Below | 0.18 | ◎ |
| Example-8 | FAS | Butanol | Nitric acid | 18.0 | Below | 0.26 | ◎ |
| Example-9 | FAS | Acetone | Nitric acid | 18.0 | Not detected | 0.30 | ◎ |
| Example-10 | XC95 | Ethanol | Nitric acid | 16.0 | Below | 0.21 | ◎ |
| Example-11 | XC95 | Butanol | Nitric acid | 16.0 | Below | 0.38 | ◎ |
| Reference-1 | FAS | i-PA | Nitric acid | 0 | 9770 | 0 | X |
| Reference-2 | FAS | i-PA | Nitric acid | 0.75 | 5240 | 0.02 | X |
| Reference-3 | FAS | i-PA | Nitric acid | 1.5 | 3600 | 0.05 | X |
| Reference-4 | FAS | i-PA | Nitric acid | 18.0 | 2360 | 0.52 | X |
| Reference-5 | FAS | Methanol | Nitric acid | 18.0 | Not detected | 0.02 | X |
| Reference-6 | XC95 | i-PA | Nitric acid | 16.0 | 800 | 0 | X |

TABLE 2

| Solvent | η-value | Monomer | Dimer | Trimer | Tetramer & higher |
|---|---|---|---|---|---|
| Ex-1 (i-PA) | 0.25 | 94 wt % | 4.0 wt % | 1.1 wt % | <1.0 wt % |
| Ex-9 (Acetone) | 0.30 | 65 wt % | 24 wt % | 7.2 wt % | <4.0 wt % |

TABLE 3

| | m-value of formura (5) | Bedding layer | Results of performance tests | | | |
|---|---|---|---|---|---|---|
| | | | Initial value | Abrasion resistance | Sunshine resistance | Alkali resistance |
| Example-12 | 9 | N | 108~110 | 107~108 | 80 | 103 |
| Example-13 | 9 | Y | 111~112 | 110~112 | 106 | 105 |
| Example-14 | 7 | N | 108~110 | 103~108 | 72 | 75 |
| Example-15 | 5 | N | 108~110 | 102~104 | 60 | 50 |
| Example-16 | 7 | Y | 111~112 | 103~108 | 89 | 80 |

What is claimed is:

1. A method of producing a water-repellent layered article, comprising the steps of:

preparing a water-repellent solution, said solution being produced by preparing a mixture by mixing by mixing a fluroalkyl group-containing silane compound, a diluting solvent and an aqueous acid solution together to induce hydrolysis and produce a hydrolysate of said silane compound;

adding a dehydrating agent to the mixture after said hydrolysis to conduct a dehydration and to accelerate a condensation polymerization reaction of the hydrolysate;

controlling the time for which the dehydration is conducted during the condensation polymerization reaction, thereby preparing a water-repellent solution containing at least dimers and trimers of said hydrolysate;

applying said water-repellent solution to a surface of a substrate; and heating said substrate to cause the fluroalkyl-group in the solution to be bonded to the surface of said substrate thereby to form the water-repellent film on said substrate, wherein said fluroalkyl group-containing silane compound is represented by the following formula:

$$CF_3(CF_2)_m(CH_2)_2SIX_3$$

wherein "m" is equal to or greater than 9 (nine) and "X" represents halogen, isocyanate-group or alkoxy-group.

2. A method as claimed in claim 1, further comprising, before application of said water-repellent solution to the surface of said substrate, forming on the surface of said substrate a bedding layer which has a minutely rough surface.

3. A method according to claim 1, wherein said dehydrating agent is removed from the mixture to terminate said dehydration.

4. A method according to claim 1, wherein the alkoxy-group in the formula is a methoxy-group, an ethoxy-group or an isopropoxy-group.

* * * * *